United States Patent [19]

Yeh

[11] Patent Number: 5,031,517
[45] Date of Patent: Jul. 16, 1991

[54] COMBINED COVER AND STRAINER ASSEMBLY FOR A COFFEE/TEA POT

[76] Inventor: Chin-Chen Yeh, No. 205, Lane 0410, Fu-Pei Rd., Ho-Mei Chen, Chenghua Hsien, Taiwan

[21] Appl. No.: 509,229
[22] Filed: Apr. 16, 1990
[51] Int. Cl.⁵ ............................................. A47J 31/18
[52] U.S. Cl. ........................................ 99/319; 99/323
[58] Field of Search ............... 99/279, 287, 297, 298, 99/316, 317, 318, 319, 322, 323; 426/433

[56] References Cited

U.S. PATENT DOCUMENTS

| | | | |
|---|---|---|---|
| 618,089 | 1/1899 | Halslam | 99/297 |
| 940,081 | 11/1909 | Curtiss | 99/319 |
| 1,424,774 | 8/1922 | Pearl | 99/319 |
| 3,339,476 | 9/1967 | Troya | 99/287 |

Primary Examiner—Robert W. Jenkins
Attorney, Agent, or Firm—Danton K. Mak

[57] ABSTRACT

A combined cover and strainer assembly for a coffee/tea pot includes a substantially dome-shaped hollow outer cover, a connecting rod slidably passing through the outer cover, a handle connected to one end of the connecting rod, a substantially dome-shaped perforated casing having an open end and an apex with an opening for receiving the second end of the connecting rod, and a perforated strainer disposed at the open end of the perforated casing. The perforated casing has an outwardly and radially extending flange with a hook section formed at the open end of the same. The second end of the connecting rod is fixed to the perforated casing. The strainer is rotatably hinged to the perforated casing and has a side releasably engaged with the hook section when the strainer covers the open end of the perforated casing to prevent the untimely separation of the strainer from the perforated casing. The handle has a flat top surface so that the combined assembly can be placed on top of a table during replenishment. The combined assembly further comprises resilient clamping jaws extending axially and inwardly at the apex of the outer cover to resiliently clamp the connecting rod. Infusion of tea or coffee into the liquid contained inside the pot is easily stopped by pulling the handle to raise the perforated casing above the water level.

5 Claims, 6 Drawing Sheets

COMBINED COVER AND STRAINER ASSEMBLY FOR A COFFEE/TEA POT

BACKGROUND OF THE INVENTION

The invention relates to a coffee/tea pot, more particularly to a combined cover and strainer assembly for a coffee/tea pot.

Referring to FIG. 1, a coffee/tea pot 2 is shown in conjunction with a combined cover and strainer assembly 3. The combined cover and strainer assembly 3 comprises a main cover 31 having an apex with a stud piece 32 extending therein. An inclining frame 33 is clamped to the apex of the main cover 31 by a nut member 34 threadedly engaged with a portion of the stud piece 32 extending inside the main cover 31. The inclining frame 31 is made of plastic and has a horizontal stub 331 at one end. The stud piece 32 has an axial hollow space 321 for receiving a connecting rod 35. The connecting rod 35 has a first section hinged to a second section. A handle 36 is connected to one end of the connecting rod 35. A second end of the connecting rod 35 passes through a perforated casing 37 and is attached to a strainer 38. The periphery 381 of the strainer 38 abuts with a slightly expanding periphery 371 of the perforated casing 37. The stub 331 is positioned slightly below the neck 22 of the pot 2 and cooperates with the periphery of the main cover 31 to maintain the position of the combined cover and strainer assembly 3 on top of the pot 2. The tea leaves or the grounded coffee are placed inside the perforated casing 37. The connecting rod 35 is pulled up or pushed down to infuse tea or coffee into the liquid inside the pot. The disadvantages of the combined cover and strainer assembly 3 are as follows:

1) When it is no longer desired to infuse tea or coffee into the liquid inside the pot 2, one has to pull the connecting rod 35 upwards and bend the same at the hinged portion to raise the perforated casing 37. The pulling and bending action adds inconvenience to the combined assembly 3.

2) When it is desired to replace the contents of the perforated casing 37, one has to hold the perforated casing 37 away from the strainer 38 while the connecting rod 35 is bent due to the hinged portion. The inside of the perforated casing 37 is then scraped to remove its contents. The removal of the contents and the replenishment of the perforated casing 37 is done while the combined assembly 3 is in an awkward position, as shown in FIG. 2, making it difficult to remove and replace the contents of the perforated casing 37.

3) When the combined assembly 3 is separated from the pot 2, there is always the possibility of an untimely separation of the strainer 38 from the perforated casing 37. Thus, the contents of the perforated casing 37 might spill from the same and cause stain to tablecloths, carpets, etc. This disadvantage is shown in FIG. 3.

SUMMARY OF THE INVENTION

Therefore, an object of this invention is to provide a combined cover and strainer assembly for a coffee/tea pot which makes it easier to stop the infusion of tea or coffee into the liquid contained inside the pot.

Another object of this invention is to provide a combined cover and strainer assembly which makes it easier to replace and replenish the contents of the perforated casing.

Still another object of this invention is to provide a combined cover and strainer assembly which prevents the untimely separation of the strainer from the perforated casing, thus avoiding the spillage of the contents.

Accordingly, the embodiment of a combined cover and strainer assembly for a coffee/tea pot according to this invention comprises: a substantially dome-shaped hollow outer cover; a connecting rod slidably passing through the outer cover; a handle connected to one end of the connecting rod; a substantially dome-shaped perforated casing having an open end and an apex with an opening for receiving the second end of the connecting rod; and a perforated strainer disposed at the open end of the perforated casing. The perforated casing has an outwardly and radially extending flange with a hook section formed at the open end of the same. The second end of the connecting rod is fixed to the perforated casing. The strainer is rotatably hinged to the perforated casing and has a side releasably engaged with the hook section when the strainer covers the open end of the perforated casing. This prevents the untimely separation of the strainer from the perforated casing. The strainer also has a transverse handle piece for ease of rotating the same. The handle has a flat top surface so that the combined assembly can be placed on top of a table during replenishment. The combined assembly further comprises resilient clamping jaws extending axially and inwardly at the apex of the outer cover to resiliently clamp the connecting rod. Infusion of tea or coffee into the liquid contained inside the pot is easily stopped by simply pulling the handle to raise the perforated casing above the water level.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1:
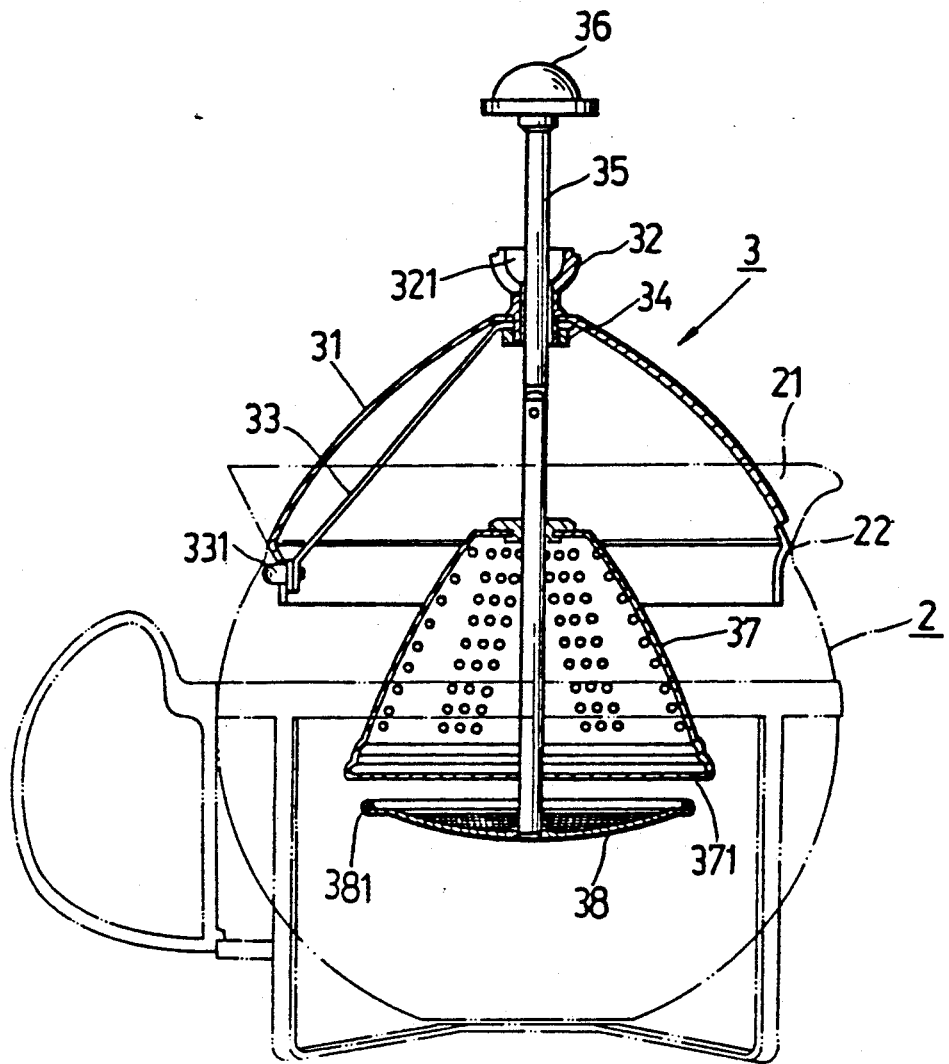
FIG. 1 is a sectional view of a conventional combined cover and strainer assembly when used in conjunction with a pot.
Figure 2:
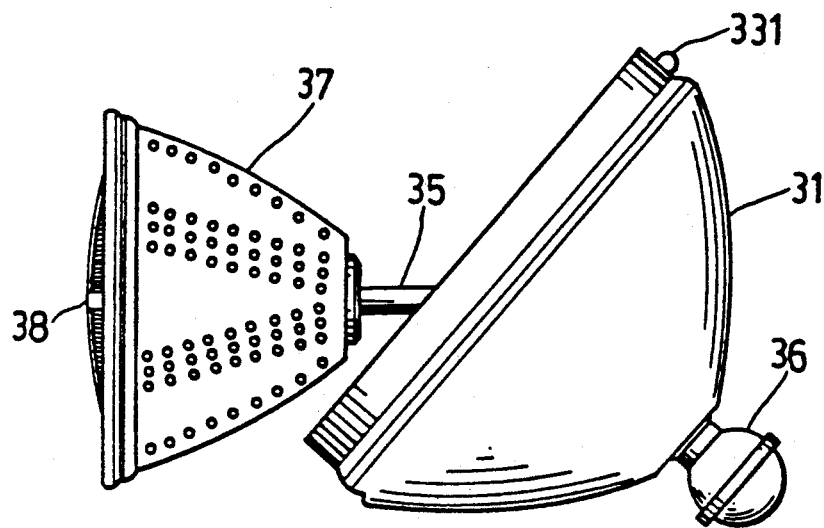
FIGS. 2, 3 illustrate the combined cover and strainer assembly of FIG. 1 when separated from the pot.
Figure 3:
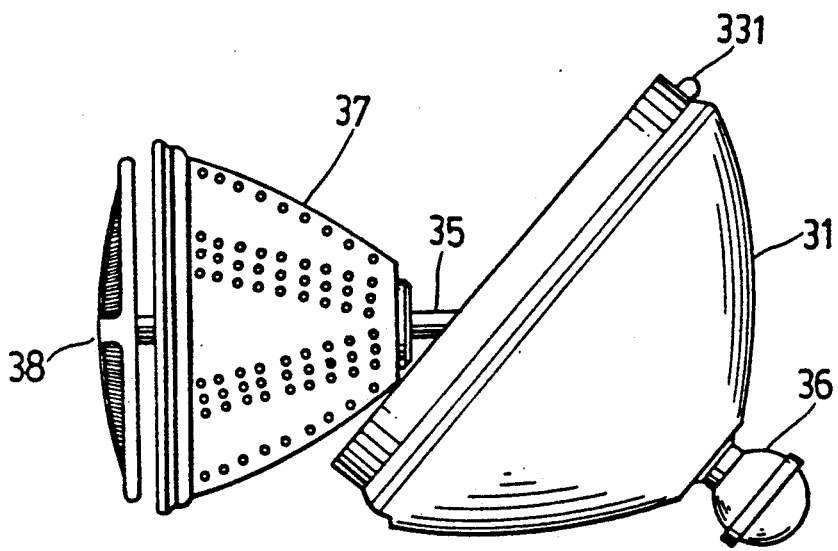
Figure 4:
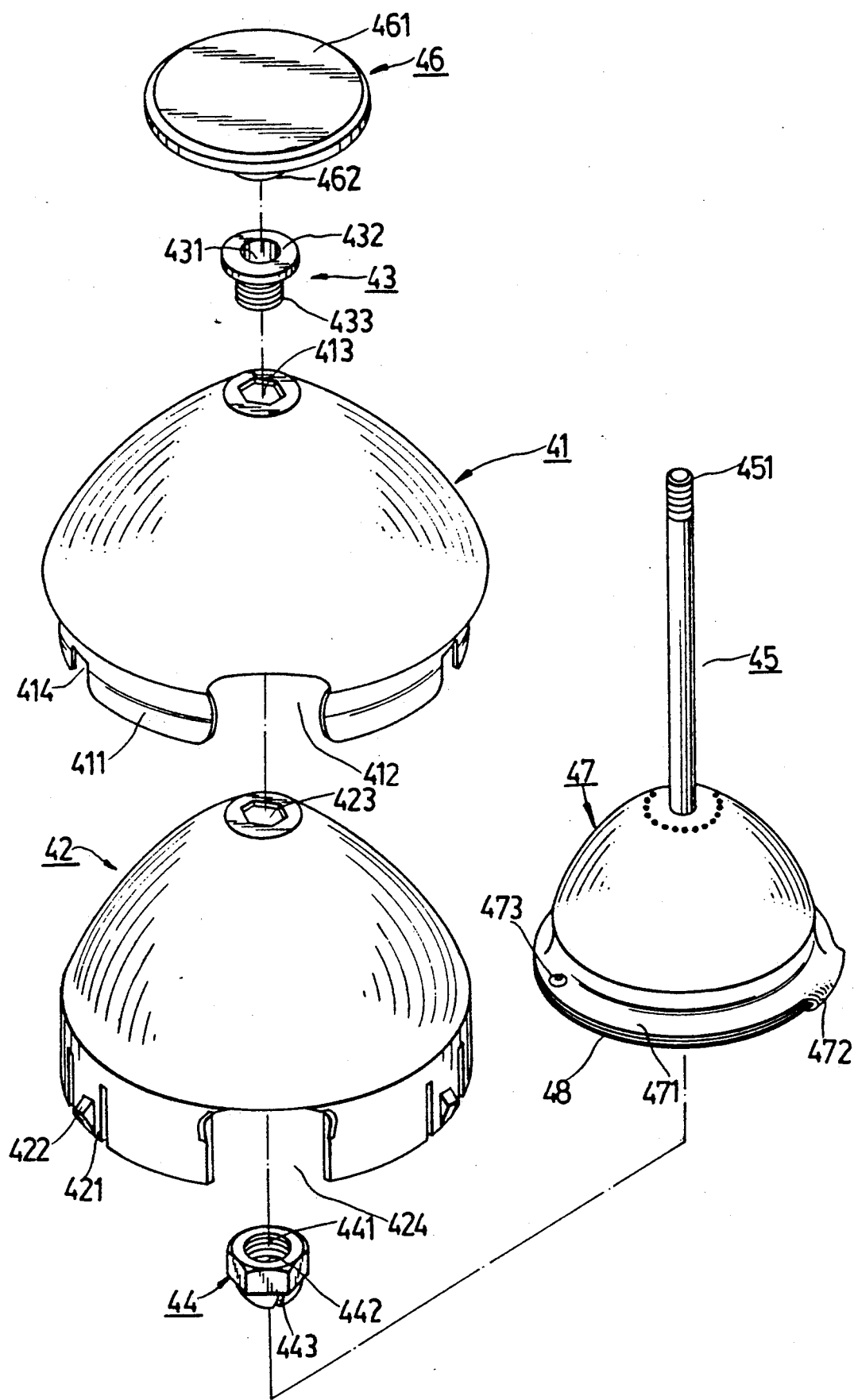
FIG. 4 is an exploded view of the preferred embodiment of a combined cover and strainer assembly according to this invention.
Figure 5:
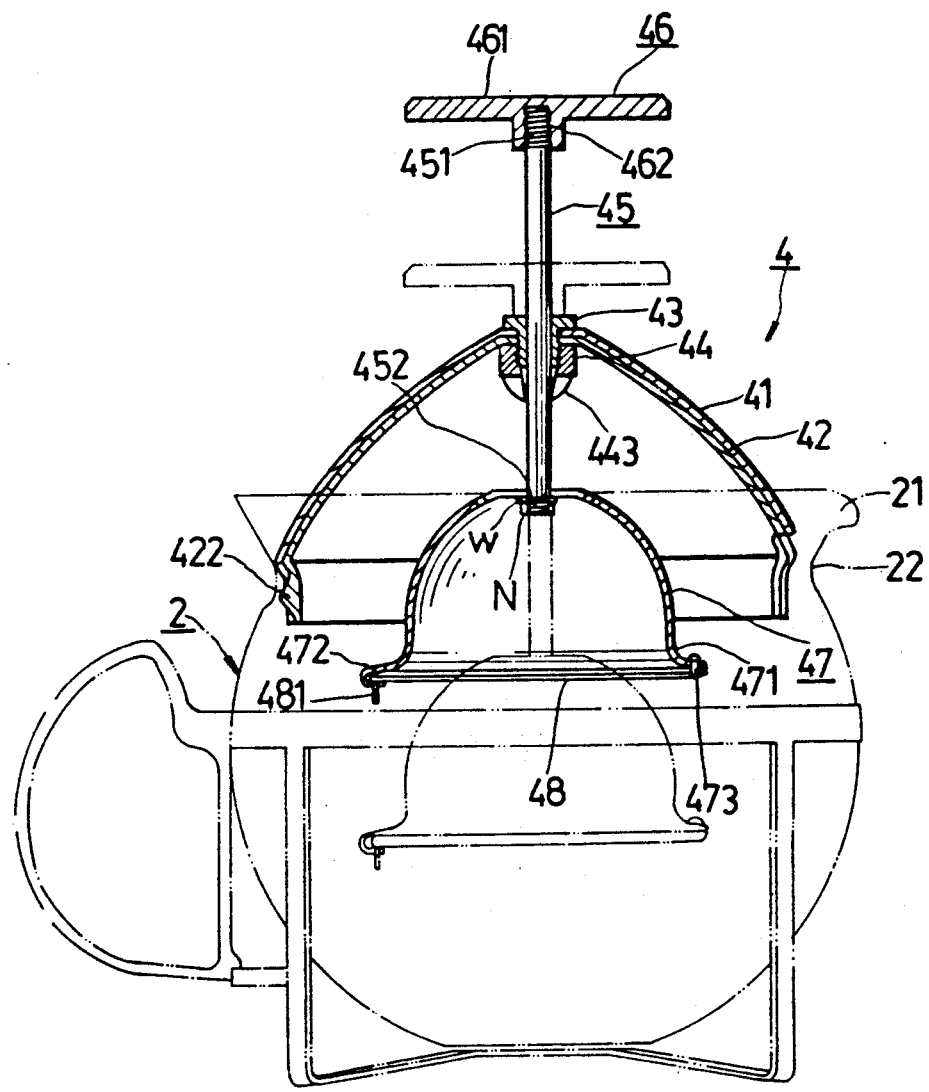
FIG. 5 is a sectional view of the preferred embodiment of FIG. 4 when used in conjunction with a pot.

Referring to FIGS. 4, 5, the preferred embodiment of a combined cover and strainer assembly 4 for a coffee/tea pot 2 according to this invention comprises a substantially dome-shaped outer cover 41. The outer cover 41 has an open end with a slightly receding periphery 411. A substantially rectangular slot 412 is formed in the periphery 411 of the outer cover 41. At least two substantially rectangular notches 414, which are spaced from the slot 412, are similarly formed in the periphery 411. The outer cover 41 further has an opening 413 formed at the apex of the same.

A plastic inner cover layer 42, which serves as an inner lining for the outer cover 41, has a shape substantially similar to that of the outer cover 41 but with a slightly smaller size. A periphery 421 of the inner cover layer 42 is provided with at least two radially and outwardly projecting stubs 422. The inner cover layer 42 similarly has an opening 423 formed at the apex and a substantially rectangular slot 424 formed at the periphery 421 of the same. When the inner cover layer 42 is joined to the outer cover 41, the stubs 422 project through the second notches 414. The slot 412 of the outer cover 41 is aligned with the slot 424 of the inner cover layer 42. The openings 413, 423 are similarly in alignment with one another.

A hollow headed stud 43 has an axial central hole 431 and a flanged head 432 abutting with the apex of the outer cover 41. The stud 43 further has an external screw thread 433 which projects inside the outer and inner cover layers 41, 42 through the openings 413, 423.

A sleeve member 44, which is sleeved onto the stud 43 inside the inner cover layer 42, has an internal screw thread 441 at a first end and a tapered opening 442 in its lower portion. The lower portion of the sleeve member 44 is substantially hemispherical in shape and is split, forming two resilient clamping jaws 443 which extend axially and slightly inwards. The internal screw thread 441 engages with the external thread 433 of the stud 43. When the stud 43 is engaged with the sleeve member 44, the central hole 431 of the stud 43 is in alignment with the hollow space of the sleeve member 44.

A connecting rod 45 is a one-piece rod having a first and a second threaded end 451, 452 and extends through the hollow spaces of the stud 43 and the sleeve member 44. The clamping jaws 443 of the sleeve member 44 resiliently clamp the connecting rod 45.

A handle 46 has a flat top surface 461. A hollow section 462 has a threaded inner wall that projects from the center of the top surface 461. The first threaded end 451 of the connecting rod 45 is threadedly engaged in the hollow section 462.

A perforated casing 47 is generally formed as a bell-shaped, a dome-shaped, or as a hemispherical hollow body. The casing 47 has an open end with an outwardly and radially extending flange 471 with a hook section 472 and a hole formed on the flange 471 for receiving a pin 473. The second threaded end 452 of the connecting rod 45 is screwed at the apex of the casing 47 to a washer W and a threaded nut N.

A strainer 48 is formed as a screen plate. The pin 473 rotatably hinges the strainer 48 to the casing 47. The strainer 48 has a transverse handle piece 481 for ease of rotating the same. A portion of the strainer 48 is releasably engaged with the hook section 472 when the strainer 48 is in a closed position.

When the embodiment is used in conjunction with a pot 2, as shown in FIG. 5, the stubs 422 of the inner cover layer 42 are positioned slightly below the neck 22 of the pot 2 and cooperate with the widest section of the periphery 411 of the outer cover 41 to maintain and hold the combined cover and strainer assembly 4 in this position. The clamping jaws 443 of the sleeve member 44 resiliently clamp the connecting rod 45 such that the position of the perforated casing 47 may be adjusted by pulling or pushing the connecting rod 45 for ease of infusing coffee or tea into the liquid inside the pot 2. Liquid is poured out from the pot 2 through the slots 412, 424 of the outer cover 41 and inner cover layers 42, respectively.

Figure 6:
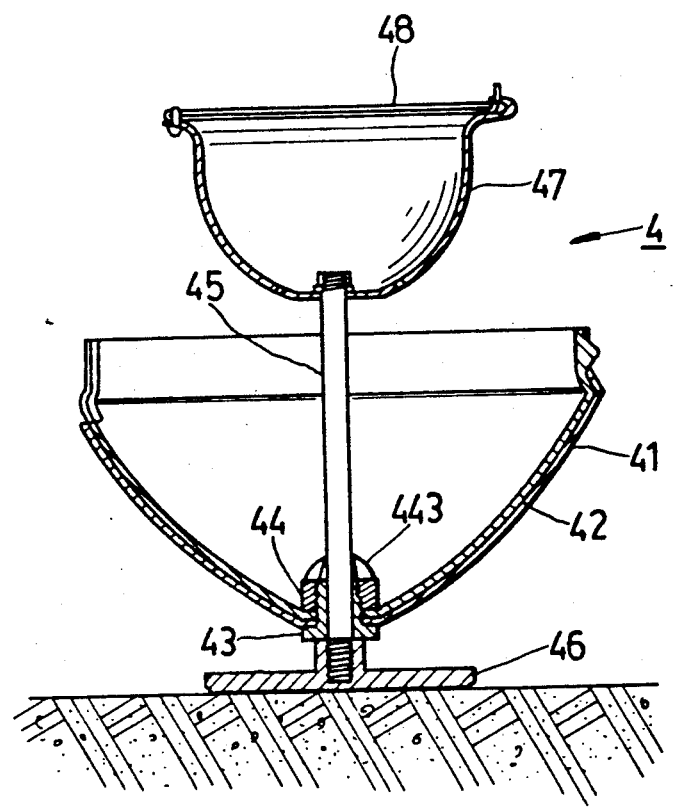
FIG. 6 is a sectional view of the preferred embodiment according to this invention when properly placed on a flat surface.

When it is desired to add liquid to the pot 2, the combined cover and strainer assembly 4 is separated from the pot 2 and can be placed on a flat surface, such as a table, by using the top surface 461 of the handle 46, as shown in FIG. 6. This facilitates ease of adding water to the pot 2 and prevents the untimely separation of the strainer 48 from the casing 47, thus avoiding the spilling of tea leaves or coffee contained inside the casing 47.

Figure 7:
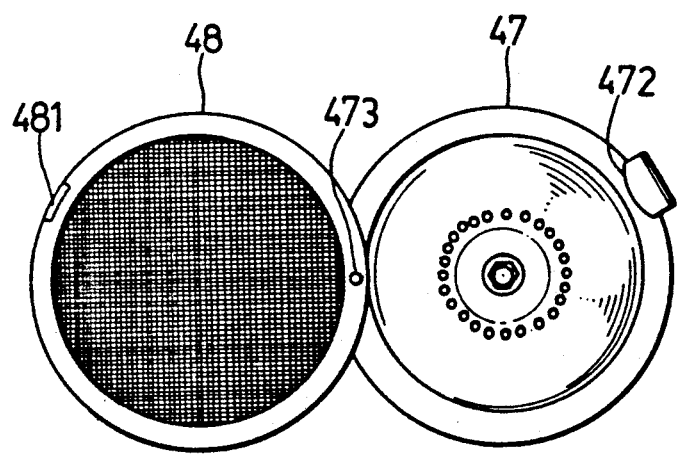
FIG. 7 is a rear view of a strainer and a perforated casing according to this invention.
Figure 8:
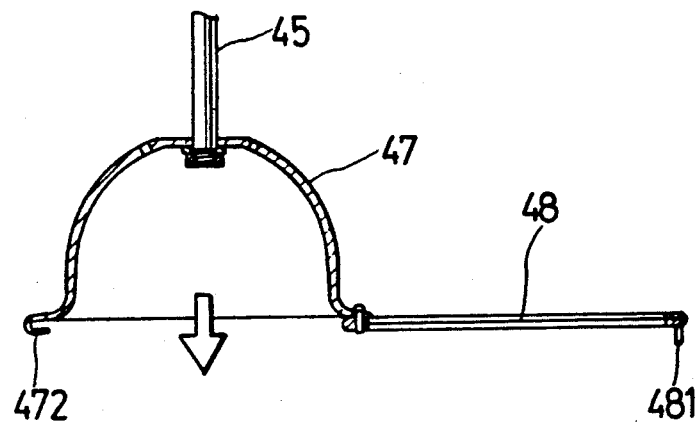
FIG. 8 illustrates the proper removal of the contents of the perforated casing of FIG. 7.
Figure 9:
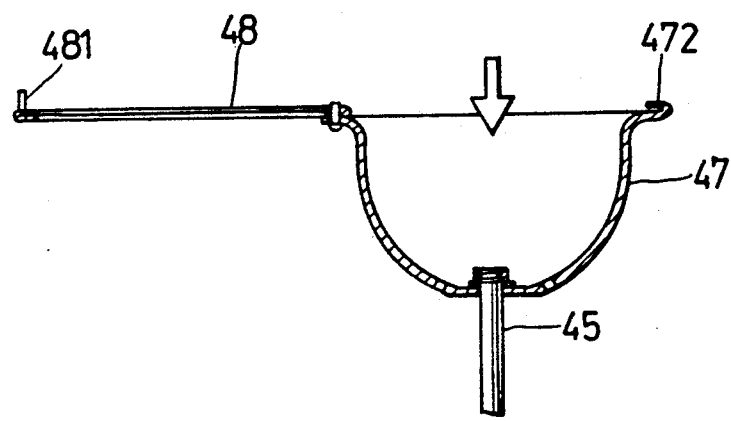
FIG. 9 illustrates the replenishment of the contents of the perforated casing of FIG. 7.

When it is desired to replace the contents of the casing 47, the strainer 48 is first rotated about the pin 473, as shown in FIG. 7. When the strainer 48 does not cover the casing 47, as shown in FIG. 8, the casing 47 is inverted to allow the contents of the same to fall off. The casing 47 can now be refilled with fresh tea leaves or coffee as shown in FIG. 9. After refilling has been done, the handle edge 481 of the strainer 48 is rotated once more to bring the same to a closed position.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A combined cover and strainer assembly for a coffee/tea pot comprising a substantially dome-shaped hollow outer cover having an apex with a first opening; a connecting rod with a first and a second end and slidably passing through said first opening of said outer cover; a handle connected to said first end of said connecting rod; a substantially dome-shaped perforated casing having a first open end and an apex with a second opening opposite said first open end for receiving said second end of said connecting rod; and a perforated strainer disposed at said first open end; and improvements, wherein:

said perforated casing has an outwardly and radially extending flange with a hook section at said first open end; said second end of said connecting rod is fixedly fitted in said second opening of said perforated casing; and said strainer is rotatably hinged to said perforated casing and has a side releasably engaged with said hook section when said strainer covers said first open end.

2. A combined cover and strainer assembly as claimed in claim 1, wherein said strainer further comprises a transverse handle piece for ease of rotating the same.

3. A combined cover and strainer assembly as claimed in claim 2, wherein said handle has a flat top surface.

4. A combined cover and strainer assembly as claimed in claim 3, further comprising a plastic inner cover layer lining said outer cover, said outer cover further having a second open end with a first slightly receding periphery and at least two notches formed at said first periphery, said inner cover layer having an apex with a third opening and a third open end with a second periphery abutting with said first periphery, said second periphery having at least two stubs radially and outwardly projecting through said notches, said stubs cooperating with said first periphery of said outer cover to position said combined cover and strainer assembly on a pot.

5. A combined cover and strainer assembly as claimed in claim 4, further comprising means for fixing said inner cover layer to said outer cover provided at said apexes of said inner cover layer and said outer cover, said fixing means including a hollow headed stud having an external screw thread and a sleeve member having an internal screw thread and two resilient clamping jaws extending axially and slightly inwards from said sleeve member, said stud extending inwardly through said apexes of said outer cover and said inner cover layer, said sleeve member being threadedly sleeved on said stud inside said inner cover layer, said connecting rod passing through said sleeve member and being resiliently clamped by said clamping jaws.

* * * * *